United States Patent
Yamamoto et al.

(10) Patent No.: US 12,162,446 B2
(45) Date of Patent: Dec. 10, 2024

(54) BRAKE DEVICE FOR VEHICLE

(71) Applicant: ADVICS CO., LTD., Kariya (JP)

(72) Inventors: Keisuke Yamamoto, Kariya (JP); Yoshio Masuda, Kariya (JP)

(73) Assignee: ADVICS CO., LTD., Kariya (JP)

( * ) Notice: Subject to any disclaimer, the term of this patent is extended or adjusted under 35 U.S.C. 154(b) by 354 days.

(21) Appl. No.: 17/640,921

(22) PCT Filed: Sep. 23, 2020

(86) PCT No.: PCT/JP2020/035807
§ 371 (c)(1),
(2) Date: Mar. 7, 2022

(87) PCT Pub. No.: WO2021/060279
PCT Pub. Date: Apr. 1, 2021

(65) Prior Publication Data
US 2022/0332301 A1    Oct. 20, 2022

(30) Foreign Application Priority Data

Sep. 26, 2019 (JP) ................................. 2019-175707

(51) Int. Cl.
*B60T 13/68* (2006.01)
*B60T 8/175* (2006.01)
(Continued)

(52) U.S. Cl.
CPC ............ *B60T 13/168* (2013.01); *B60T 8/175* (2013.01); *B60T 8/1755* (2013.01); *B60T 8/40* (2013.01); *B60T 13/686* (2013.01)

(58) Field of Classification Search
CPC .......... B60T 8/40; B60T 8/175; B60T 8/1755; B60T 13/168; B60T 13/686
(Continued)

(56) References Cited

U.S. PATENT DOCUMENTS

| 6,345,869 B1 * | 2/2002 | Matsuo | ................. B60T 8/4845 303/162 |
| 8,500,217 B2 * | 8/2013 | Isono | .................... B60T 13/146 303/119.2 |

(Continued)

FOREIGN PATENT DOCUMENTS

| JP | 2009262836 A | 11/2009 |
| JP | 2010116050 A | 5/2010 |
| JP | 2019059294 A | 4/2019 |

OTHER PUBLICATIONS

International Search Report (PCT/ISA/210) with translation and Written Opinion (PCT/ISA/237) mailed on Dec. 1, 2020, by the Japan Patent Office as the International Searching Authority for International Application No. PCT/JP2020/035807. (9 pages).

*Primary Examiner* — Christopher P Schwartz
(74) *Attorney, Agent, or Firm* — BUCHANAN INGERSOLL & ROONEY PC (57) ABSTRACT

A brake device includes: a first pressurizing unit configured to increase a WC pressure by supplying brake fluid into wheel cylinders provided in wheels RL and RR; a second pressurizing unit connected to a reservoir tank via a fourth flow passage and configured to increase the WC pressure by supplying the brake fluid taken in from the reservoir tank into the wheel cylinders; and a brake control unit configured to control at least one of the first pressurizing unit and the second pressurizing unit based on a target WC pressure. The brake control unit is configured to, when the WC pressure is to be increased by operating the second pressurizing unit, execute an auxiliary brake control in which the first pressurizing unit is operated to assist the second pressurizing unit to increase the WC pressure.

4 Claims, 2 Drawing Sheets

(51) Int. Cl.
*B60T 8/1755* (2006.01)
*B60T 8/40* (2006.01)
*B60T 13/16* (2006.01)

(58) Field of Classification Search
USPC .......... 303/113.4, 115.2, 115.4, 116.2, 119.2
See application file for complete search history.

(56) References Cited

U.S. PATENT DOCUMENTS

| | | | |
|---|---|---|---|
| 9,126,575 B2* | 9/2015 | Kamiya | ................ B60T 13/662 |
| 11,299,135 B2* | 4/2022 | Yamamoto | .............. B60T 8/409 |
| 2004/0256912 A1* | 12/2004 | Hamada | ................ B60T 8/1766 |
| | | | 303/113.5 |
| 2020/0247379 A1 | 8/2020 | Yamamoto et al. | |

* cited by examiner

BRAKE DEVICE FOR VEHICLE

TECHNICAL FIELD

The present disclosure relates to a brake device for a vehicle that regulates a hydraulic pressure in a wheel cylinder provided for a wheel of the vehicle.

BACKGROUND ART

As a brake device that adjusts a brake force of a wheel by controlling a hydraulic pressure in a wheel cylinder, for example, as described in PTL 1, a device including a first pressurizing unit and a second pressurizing unit is known.

Such a brake device operates the first pressurizing unit or the second pressurizing unit according to a content of a brake control for regulating the hydraulic pressure in the wheel cylinder. For example, during execution of a brake control for generating a brake force corresponding to an amount of operation on a brake pedal, the hydraulic pressure in the wheel cylinder is increased by operating the first pressurizing unit. On the other hand, in a case where the brake force of the wheel is individually adjusted for each wheel as in execution of a brake control for preventing an excessive oversteer behavior and an excessive understeer behavior that may occur in a traveling vehicle, the hydraulic pressure in the wheel cylinder is increased by operating the second pressurizing unit.

CITATION LIST

Patent Literature

PTL 1: JP-A-2019-59294

SUMMARY

Technical Problem

In the brake device as described above, there is room for improvement in controllability when the hydraulic pressure in the wheel cylinder is regulated by operating the second pressurizing unit.

Solution to Problem

Hereinafter, means for solving the above-mentioned problem and actions and effects thereof will be described.

A brake device for a vehicle for solving the above-mentioned problems includes: a first pressurizing unit configured to increase, by supplying brake fluid into a wheel cylinder provided in a wheel of a vehicle, a hydraulic pressure in the wheel cylinder; a second pressurizing unit connected to a reservoir tank via a communication passage and configured to increase, by supplying the brake fluid taken in from the reservoir tank into the wheel cylinder, the hydraulic pressure in the wheel cylinder; and a brake control unit configured to control at least one of the first pressurizing unit and the second pressurizing unit based on a target value of the hydraulic pressure in the wheel cylinder. The brake control unit is configured to, when the hydraulic pressure in the wheel cylinder is to be increased by operating the second pressurizing unit, execute an auxiliary brake control in which the first pressurizing unit is operated to assist the second pressurizing unit to increase the hydraulic pressure in the wheel cylinder.

In a second brake control, when only the second pressurizing unit is operated to increase the hydraulic pressure in the wheel cylinder, a time until the hydraulic pressure in the wheel cylinder reaches the target value may increase due to a pressure loss in the communication passage from the reservoir tank to the second pressurizing unit or the like. In this regard, according to the above-mentioned configuration, when the second pressurizing unit is operated to increase the hydraulic pressure in the wheel cylinder, the first pressurizing unit is auxiliary operated in addition to the second pressurizing unit. Therefore, it is possible to prevent an increase in the time required to increase the hydraulic pressure in the wheel cylinder to the target value. That is, controllability when the hydraulic pressure in the wheel cylinder is regulated by operating the second pressurizing unit can be improved.

DESCRIPTION OF EMBODIMENTS

Hereinafter, an embodiment of a brake device for a vehicle will be described with reference to the drawings.

Figure 1:
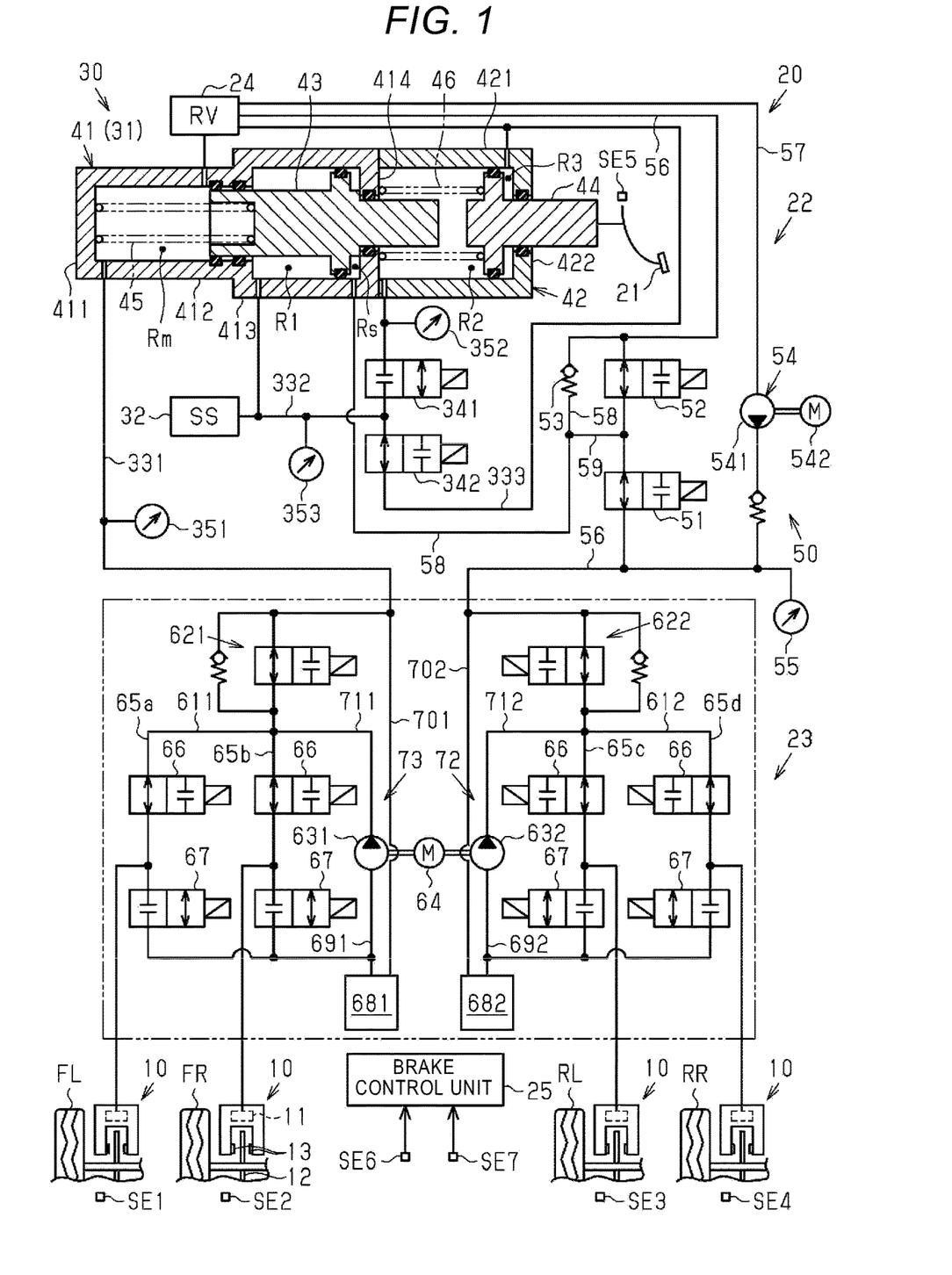
FIG. 1 is a schematic diagram illustrating a schematic configuration of a vehicle including a brake device for a vehicle according to an embodiment.

FIG. 1 illustrates a vehicle including a brake device according to the present embodiment. The vehicle illustrated in FIG. 1 includes: a plurality of wheels FL, FR, RL, and RR; and a plurality of brake mechanisms 10 that apply brake forces to the plurality of wheels FL, FR, RL, and RR, respectively. The brake forces applied to the wheels FL, FR, RL, and RR by the respective brake mechanisms 10 are adjusted by the brake device 20.

Each brake mechanism 10 includes: a wheel cylinder 11 to which brake fluid is supplied; a rotary plate 12 that rotates integrally with a corresponding one of the wheels FL, FR, RL, and RR; and friction materials 13 that move relative to the rotary plate 12 in a thickness direction of the rotary plate 12. The brake mechanism 10 strongly presses the friction materials 13 against the rotary plate 12 as a WC pressure, which is the hydraulic pressure in the wheel cylinder 11, increases. That is, the brake mechanism 10 increases the brake forces applied to the wheels FL, FR, RL, and RR as the WC pressure increases. In the following description, the hydraulic pressures in wheel cylinders 11 for the wheels FL, FR, RL, and RR are also referred to as "WC pressures of the wheels FL, FR, RL, and RR".

As illustrated in FIG. 1, the brake device 20 includes: a brake operation member 21 such as a brake pedal; a hydraulic pressure generating device 22 that generates a hydraulic pressure corresponding to an amount of operation on the brake operation member 21; a brake actuator 23 that individually regulates the WC pressures of the plurality of wheels FL, FR, RL, and RR; and a reservoir tank 24 that stores the brake fluid. The brake device 20 includes a brake control unit 25 that controls the hydraulic pressure generating device 22 and the brake actuator 23.

As illustrated in FIG. 1, the hydraulic pressure generating device 22 includes: a master device 30 that supplies the brake fluid to the brake actuator 23; and a servo pressure generating device 50 that supplies the brake fluid to the master device 30 and the brake actuator 23. The hydraulic pressure generating device 22 of the present embodiment is a so-called brake-by-wire hydraulic pressure generating device.

The master device 30 includes: a master cylinder 31; a stroke simulator 32 that generates a reaction force corresponding to the amount of operation on the brake operation member 21; a plurality of flow passages 331, 332, and 333 that communicate with the master cylinder 31; a plurality of control valves 341 and 342 that control a flow of the brake fluid; and a plurality of hydraulic pressure sensors 351, 352, and 353 that detect hydraulic pressures.

The master cylinder 31 includes: a main cylinder 41; a cover cylinder 42; a master piston 43 and an input piston 44 that move relative to the main cylinder 41 and the cover cylinder 42; a master spring 45 that biases the master piston 43; and an input spring 46 that biases the input piston 44. In the following description, a left side of the master cylinder 31 in FIG. 1 is defined as a front side, and a right side of the master cylinder 31 in FIG. 1 is defined as a rear side.

The main cylinder 41 includes: a substantially disk-shaped bottom wall 411; a first peripheral wall 412 extending from the bottom wall 411 along an axis of the bottom wall 411; a second peripheral wall 413 extending from a rear end of the first peripheral wall 412 along an axis of the first peripheral wall 412; and a first annular wall 414 extending from a rear end of the second peripheral wall 413 toward an axis of the second peripheral wall 413. The first peripheral wall 412 and the second peripheral wall 413 each have a cylindrical shape, and the first annular wall 414 has an annular shape. An inner diameter of the first peripheral wall 412 is smaller than an inner diameter of the second peripheral wall 413.

The main cylinder 41 includes: a master chamber Rm defined by the bottom wall 411, the first peripheral wall 412, and the master piston 43; a first fluid chamber R1 defined by the second peripheral wall 413 and the master piston 43; and a servo chamber Rs defined by the second peripheral wall 413, the first annular wall 414, and the master piston 43. The master chamber Rm is formed at a position close to a front end of the master cylinder 31, the first fluid chamber R1 is formed behind the master chamber Rm, and the servo chamber Rs is formed behind the first fluid chamber R1. Inside the main cylinder 41, the master chamber Rm, the first fluid chamber R1, and the servo chamber Rs are not connected to each other.

The cover cylinder 42 includes: a third peripheral wall 421 that has a cylindrical shape; and a second annular wall 422 extending from a rear end of the third peripheral wall 421 toward an axis of the third peripheral wall 421. The third peripheral wall 421 is joined to the first annular wall 414 such that the axis of the third peripheral wall 421 coincides with the axis of the second peripheral wall 413 of the main cylinder 41.

The cover cylinder 42 includes: a second fluid chamber R2 defined by the first annular wall 414 of the main cylinder 41, the third peripheral wall 421, and the input piston 44; and a third fluid chamber R3 defined by the third peripheral wall 421, the second annular wall 422, and the input piston 44. In the master cylinder 31, the second fluid chamber R2 is formed behind the servo chamber Rs, and the third fluid chamber R3 is formed behind the second fluid chamber R2. Inside the cover cylinder 42, the second fluid chamber R2 and the third fluid chamber R3 are not connected to each other.

The master piston 43 is stored in the master cylinder in a state of being in surface contact with inner peripheral surfaces of the first peripheral wall 412, the second peripheral wall 413, and the first annular wall 414 of the main cylinder 41. Therefore, when the master piston 43 moves in an axial direction, the master piston 43 slides on the inner peripheral surfaces of the first peripheral wall 412, the second peripheral wall 413, and the first annular wall 414. A rear end portion of the master piston 43 protrudes rearward than the first annular wall 414 and is located in the second fluid chamber R2.

The input piston 44 is stored in the master cylinder in a state of being in surface contact with inner peripheral surfaces of the third peripheral wall 421 and the second annular wall 422 of the cover cylinder 42. Therefore, when moving in the axial direction, the input piston 44 slides on the inner peripheral surfaces of the third peripheral wall 421 and the second annular wall 422. A rear end portion of the input piston 44 protrudes rearward than the second annular wall 422 and is connected to the brake operation member 21. The input piston 44 moves in a direction approaching the master piston 43 according to the amount of operation on the brake operation member 21. In the second fluid chamber R2, a gap is formed between the input piston 44 and the master piston 43.

The master spring 45 is disposed in the master chamber Rm of the main cylinder 41, specifically, between the bottom wall 411 of the main cylinder 41 and the master piston 43. The master spring 45 biases the master piston 43 rearward. That is, when the master piston 43 moves forward, the master spring 45 is elastically compressed.

The input spring 46 is disposed in the second fluid chamber R2 of the cover cylinder 42, specifically, between the first annular wall 414 of the main cylinder 41 and the input piston 44. The input spring 46 biases the input piston 44 rearward. That is, when the input piston 44 moves forward, the input spring 46 is elastically compressed.

In the master cylinder 31, the master chamber Rm is connected to the reservoir tank 24. Specifically, a portion near a rear end of the master chamber Rm is connected to the reservoir tank 24 via a port formed in the first peripheral wall 412 of the main cylinder 41. Therefore, when the master piston 43 moves forward from an initial position illustrated in FIG. 1, the master chamber Rm and the reservoir tank 24 are not connected to each other. As a result, as the master piston 43 moves forward, the hydraulic pressure in the master chamber Rm increases.

The third fluid chamber R3 is connected to the reservoir tank 24 via the third flow passage 333 to be described later. Therefore, when the input piston 44 moves forward, the brake fluid is supplied from the reservoir tank 24 to the third fluid chamber R3, and when the input piston 44 moves rearward, the brake fluid is discharged from the third fluid chamber R3 to the reservoir tank 24.

The first flow passage 331 connects the master chamber Rm and the brake actuator 23, the second flow passage 332 connects the first fluid chamber R1 and the second fluid chamber R2, and the third flow passage 333 connects the reservoir tank 24 and the second flow passage 332.

A first control valve 341 is a normally-closed solenoid valve, and a second control valve 342 is a normally-open solenoid valve. The first control valve 341 is provided in the second flow passage 332 and on a second fluid chamber R2 side of a connection point between the second flow passage 332 and the third flow passage 333. The second control valve 342 is provided in the third flow passage 333 and near the connection point between the third flow passage 333 and the second flow passage 332. When the brake control unit 25 to be described later is operating, the first control valve 341 is opened and the second control valve 342 is closed.

The master hydraulic pressure sensor 351 is provided in the first flow passage 331 and detects the hydraulic pressure in the master chamber Rm. The input hydraulic pressure sensor 352 is provided on a second fluid chamber R2 side of the first control valve 341 in the second flow passage 332, and detects the hydraulic pressure in the second fluid chamber R2. The simulator hydraulic pressure sensor 353 is provided closer to the first fluid chamber R1 than the connection point between the second fluid passage 332 and the third fluid passage 333 in the second flow passage 332, and detects the hydraulic pressure in the second flow passage 332 to which the stroke simulator 32 is connected. In the following description, the hydraulic pressure detected by the master hydraulic pressure sensor 351 is also referred to as a "master pressure", the hydraulic pressure detected by the input hydraulic pressure sensor 352 is also referred to as an "input hydraulic pressure", and the hydraulic pressure detected by the simulator hydraulic pressure sensor 353 is also referred to as a "simulator hydraulic pressure".

Next, the servo pressure generating device 50 will be described.

The servo pressure generating device 50 includes: a first hydraulic pressure regulating valve 51 and a second hydraulic pressure regulating valve 52 that are normally-open linear solenoid valves; a check valve 53 that limits a flow of the brake fluid; a first pressurizing unit 54 that increases the WC pressure by supplying the brake fluid into the wheel cylinder 11; and a servo pressure sensor 55 that detects a hydraulic pressure between the first hydraulic pressure regulating valve 51 and the first pressurizing unit 54. The servo pressure generating device 50 includes: a fourth flow passage 56 that connects the brake actuator 23 and the reservoir tank 24; a fifth flow passage 57 that connects the reservoir tank 24 and the fourth flow passage 56; a sixth flow passage 58 that connects the servo chamber Rs and the fourth flow passage 56; and a seventh flow passage 59 that connects the fourth flow passage 56 and the sixth flow passage 58.

The first hydraulic pressure regulating valve 51 is provided between a connection point between the fourth flow passage 56 and the fifth flow passage 57 and a connection point between the fourth flow passage 56 and the seventh flow passage 59 in the fourth flow passage 56, and the second hydraulic pressure regulating valve 52 is provided between the connection point between the fourth flow passage 56 and the sixth flow passage 58 and the connection point between the fourth flow passage 56 and the seventh flow passage 59 in the fourth flow passage 56. The first hydraulic pressure regulating valve 51 and the second hydraulic pressure regulating valve 52 each corresponds to an example of an "electronically controlled regulating valve". The check valve 53 is provided in the sixth flow passage 58 so as to be parallel to the second hydraulic pressure regulating valve 52. The check valve 53 allows the brake fluid to flow from the reservoir tank 24 toward the servo chamber Rs.

The first pressurizing unit 54 is provided in the fifth flow passage 57. The first pressurizing unit 54 includes: a pump 541 that discharges the brake fluid pumped up from the reservoir tank 24; and an electric motor 542 that drives the pump 541.

The servo pressure sensor 55 is provided between a connection point between the fifth flow passage 57 and the fourth flow passage 56 and the first pressurizing unit 54 in the fifth flow passage 57. In the following description, the hydraulic pressure detected by the servo pressure sensor 55 is also referred to as a "servo pressure".

The servo pressure generating device 50 supplies the regulated brake fluid to the brake actuator 23 and the master cylinder 31 by regulating opening degrees of the first hydraulic pressure regulating valve 51 and the second hydraulic pressure regulating valve 52 in a situation where the first pressurizing unit 54 is operated. Specifically, the brake fluid whose pressure is regulated by the first hydraulic pressure regulating valve 51 is supplied to the brake actuator 23, and the brake fluid whose pressure is regulated by the second hydraulic pressure regulating valve 52 is supplied to the servo chamber Rs of the master cylinder 31.

Next, the brake actuator 23 will be described.

The brake actuator 23 is provided with two hydraulic circuits 611 and 612. Two wheel cylinders 11 for front wheels FL and FR are connected to the first hydraulic circuit 611. Two wheel cylinders 11 for rear wheels RL and RR are connected to the second hydraulic circuit 612.

The first hydraulic circuit 611 is connected to the reservoir tank 24 via the first flow passage 331 and the master chamber Rm. In the first hydraulic circuit 611, a first differential pressure regulating valve 621, which is a normally-open linear solenoid valve, is provided in a fluid passage connecting the wheel cylinder 11 and a connection point between the first hydraulic circuit 611 and the first flow passage 331.

The second hydraulic circuit 612 is connected to the reservoir tank 24 via the fourth flow passage 56. In the second hydraulic circuit 612, a second differential pressure regulating valve 622, which is a normally-open linear solenoid valve, is provided in a fluid passage connecting the wheel cylinder 11 and a connection point between the second hydraulic circuit 612 and the fourth flow passage 56.

The hydraulic circuits 611 and 612 are respectively provided with a pump 631 and a pump 632 that supply the brake fluid to fluid passages respectively connecting the differential pressure regulating valves 621 and 622 and the wheel cylinders 11. A power source of the pump 631 and the pump 632 is an electric motor 64.

In the hydraulic circuit 611, paths 65a and 65b of the same number as the number of the wheel cylinders 11 connected to the hydraulic circuit 611 are provided on a wheel cylinder 11 side of the first differential pressure regulating valve 621. Similarly, in the hydraulic circuit 612, paths 65c and 65d of the same number as the number of the wheel cylinders 11 connected to the hydraulic circuit 612 are provided on the wheel cylinder 11 side of the second differential pressure regulating valve 622. Each of the paths 65a to 65d is provided with a holding valve 66 that is closed when an increase in the WC pressure is restricted, and a pressure reducing valve 67 that is opened when the WC pressure is decreased. That is, each holding valve 66 is disposed in the fluid passage on the wheel cylinder 11 side of the differential pressure regulating valve 621 or the differential pressure regulating valve 622. Each holding valve 66 is a normally-open solenoid valve, and each pressure reducing valve 67 is a normally-closed solenoid valve.

Reservoirs 681 and 682 that temporarily store the brake fluid flowing out from the wheel cylinders 11 via the pressure reducing valves 67 when the pressure reducing valves 67 are opened are respectively connected to the hydraulic circuits 611 and 612. The reservoirs 681 and 682 are respectively connected to the pumps 631 and 632 via suction flow passages 691 and 692.

The reservoir 681 is connected, via a tank-side flow passage 701, to a fluid passage connecting the differential pressure regulating valve 621 and the master chamber Rm. The reservoir 682 is connected, via a tank-side flow passage 702, to a fluid passage connecting the differential pressure regulating valve 622 and a connection point between the second hydraulic circuit 612 and the fourth flow passage 56.

The pumps 631 and 632 respectively suck the brake fluid in the reservoir tank 24 via the reservoirs 681 and 682, and discharge the brake fluid to the fluid passages between the differential pressure regulating valves 621 and 622 and the holding valves 66. Fluid passages between the above-mentioned fluid passages and the pumps 631 and 632 are referred to as intermediate fluid passages 711 and 712.

Specifically, when the pump 631 is operated, the brake fluid is discharged from the reservoir tank 24 to the intermediate fluid passage 711 via the master chamber Rm, the first flow passage 331, the tank-side flow passage 701, the reservoir 681, and the suction flow passage 691. On the other hand, when the pump 632 is operated, the brake fluid is discharged from the reservoir tank 24 to the intermediate fluid passage 712 via the fourth flow passage 56, the tank-side flow passage 702, the reservoir 682, and the suction flow passage 692. In this regard, in the present embodiment, the fourth flow passage 56, the tank-side flow passage 702, and the suction flow passage 692 correspond to an example of a "communication passage".

In the brake actuator 23, when the differential pressure regulating valves 621 and 622 are operated and brake fluid is discharged from the pumps 631 and 632, differential pressures are generated between the brake fluid in the tank-side flow passage 701 and the brake fluid in the intermediate fluid passage 711 and between the brake fluid in the tank-side flow passage 702 and the brake fluid in the intermediate fluid passage 712. In the following description, the differential pressures generated between the brake fluid in the tank-side flow passage 701 and the brake fluid in the intermediate fluid passage 711 and between the brake fluid in the tank-side flow passage 702 and the brake fluid in the intermediate fluid passage 712 are also referred to as "differential pressures generated on both sides of the differential pressure regulating valves 621 and 622".

The WC pressure can be regulated by generating such differential pressures. Therefore, in the present embodiment, an example of a "second pressurizing unit 72" is configured. The second pressurizing unit 72 is connected to the reservoir tank 24 via the communication passage and increases the WC pressures of the rear wheels RL and RR by supplying the brake fluid taken in from the reservoir tank 24 into the wheel cylinders 11 by the pump 632, the electric motor 64, and the differential pressure regulating valve 622. A "third pressurizing unit 73" is configured. The third pressurizing unit 73 increases the WC pressures of the front wheels FL and FR by supplying the brake fluid taken in from the reservoir tank 24 into the wheel cylinders 11 by the pump 631, the electric motor 64, and the differential pressure regulating valve 621. The second pressurizing unit 72 and the third pressurizing unit 73 share the electric motor 64.

The hydraulic pressure generating device 22 described above can apply, to each of the front wheels FL and FR, a brake force corresponding to an amount of operation applied on the brake operation member 21 by a driver even when the brake control unit 25 to be described later is not involved. In the following description, applying, to the front wheels FL and FR, the brake force corresponding to the amount of operation applied the brake operation member 21 by the driver without involving the brake control unit 25 is also referred to as "manual brake".

In the manual brake, the first control valve 341 is closed and the second control valve 342 is opened for that the first control valve 341 is a normally-closed solenoid valve and the second control valve 342 is a normally-open solenoid valve. Therefore, the first fluid chamber R1 of the master cylinder 31 is connected to the reservoir tank 24 via the second flow passage 332 and the third flow passage 333, and the second fluid chamber R2 of the master cylinder 31 is a closed space in which the brake fluid cannot flow in and out.

Therefore, in the manual brake, when the input piston 44 moves forward by operating the brake operation member 21, the hydraulic pressure in the second fluid chamber R2 increases. Thus, the brake fluid in the second fluid chamber R2 presses the master piston 43, and the master piston 43 moves forward. Therefore, the brake fluid is supplied from the master chamber Rm into the wheel cylinders 11 for the front wheels FL and FR via the first hydraulic circuit 611 of the brake actuator 23. As a result, the WC pressures of the front wheels FL and FR increase. When the input piston moves forward, the brake fluid is supplied from the reservoir tank 24 to the third fluid chamber R3, and when the master piston 43 moves forward, the brake fluid is supplied from the reservoir tank 24 to the servo chamber Rs.

On the other hand, in the manual brake, when the operation on the brake operation member 21 is canceled, the master piston 43 moves rearward as the input piston 44 moves rearward. Therefore, the brake fluid flows from the wheel cylinders 11 for the front wheels FL and FR into the master chamber Rm via the first hydraulic circuit 611 of the brake actuator 23. As a result, the WC pressures of the front wheels FL and FR decrease. When the input piston 44 moves rearward, the brake fluid is discharged from the third fluid chamber R3 to the reservoir tank 24, and when the master piston 43 moves rearward, the brake fluid is discharged from the servo chamber Rs to the reservoir tank 24.

Next, the brake control unit 25 will be described. Detection signals are input to the brake control unit 25 from various sensors such as the master hydraulic pressure sensor 351, the input hydraulic pressure sensor 352, the simulator hydraulic pressure sensor 353, the servo pressure sensor 55, a plurality of wheel speed sensors SE1 to SE4, a stroke sensor SE5, a yaw rate sensor SE6, and a steering angle sensor SE7. The master hydraulic pressure sensor 351 outputs a signal corresponding to a detected master pressure as a detection signal. The input hydraulic pressure sensor 352 outputs a signal corresponding to a detected input hydraulic pressure as a detection signal. The simulator hydraulic pressure sensor 353 outputs a signal corresponding to a detected simulator hydraulic pressure as a detection signal. The wheel speed sensors SE1 to SE4 are respectively provided for the wheels FL, FR, RL, and RR, and detect wheel speeds of the corresponding wheels FL, FR, RL, and RR. The wheel speed sensors SE1 to SE4 output signals corresponding to the detected wheel speeds as detection signals. The stroke sensor SE5 detects an amount of operation on the brake operation member 21, and outputs a signal corresponding to the detected amount of operation as a detection signal. The yaw rate sensor SE6 detects a yaw rate of the vehicle and outputs a signal corresponding to the detected yaw rate as a detection signal. The steering angle sensor SE7 detects a steering angle of a steering wheel and outputs a signal corresponding to the detected steering angle as a detection signal.

The brake control unit 25 calculates a brake force requested by the driver based on a detection result of at least one of the simulator hydraulic pressure sensor 353 and the stroke sensor SE5. The brake control unit 25 calculates a vehicle body speed and slip amounts of the wheels FL, FR, RL, and RR based on detection results of the wheel speed sensors SE1 to SE4. Further, the brake control unit 25 calculates a target yaw rate based on the detection results of the wheel speed sensors SE1 to SE4 and the steering angle sensor SE7, and calculates an actual yaw rate based on the detection result of the yaw rate sensor SE6.

The brake control unit 25 executes, based on the above-mentioned various parameters, a first brake control for regulating the WC pressures of the wheels FL, FR, RL, and RR by operating the first pressurizing unit 54 of the servo pressure generating device 50 and a second brake control for individually regulating the WC pressures of the rear wheels RL and RR by operating the second pressurizing unit 72 of the brake actuator 23.

Hereinafter, the first brake control will be described.

In the first brake control, the brake control unit 25 regulates the WC pressures of the wheels FL, FR, RL, and RR based on a WC pressure target value (hereinafter, also referred to as a "target WC pressure") obtained by converting the brake force requested by the driver into a WC pressure.

In the first brake control, when the target WC pressure is increased, the brake control unit 25 controls, in a state where the first pressurizing unit 54 is operated, the first hydraulic pressure regulating valve 51 and the second hydraulic pressure regulating valve 52 such that the master pressure increases to a hydraulic pressure corresponding to the target WC pressure. Thus, the brake fluid whose pressure is regulated is supplied to the servo chamber Rs of the master cylinder 31, and the master piston 43 moves forward. Subsequently, the brake fluid is supplied from the master chamber Rm into the wheel cylinders 11 for the front wheels FL and FR via the first hydraulic circuit 611 of the brake actuator 23. As a result, the WC pressures of the front wheels FL and FR are increased to the target WC pressure.

The brake control unit 25 controls, in a state where the first pressurizing unit 54 is operated, the first hydraulic pressure regulating valve 51 such that the servo pressure increases to the hydraulic pressure corresponding to the target WC pressure. Thus, the brake fluid is supplied from the fourth flow passage 56 into the wheel cylinders 11 for the rear wheels RL and RR via the second hydraulic circuit 612 of the brake actuator 23. As a result, the WC pressures of the rear wheels RL and RR are increased to the target WC pressure. In this case, the hydraulic pressure of the brake fluid whose pressure is regulated by the first hydraulic pressure regulating valve 51 and the WC pressures of the rear wheels RL and RR are substantially equal for that the brake fluid whose pressure is regulated by the first hydraulic pressure regulating valve 51 is directly supplied into the wheel cylinders 11 for the rear wheels RL and RR.

In the first brake control, when the target WC pressure is maintained, the brake control unit 25 continues the operation of the first pressurizing unit 54, and controls the first hydraulic pressure regulating valve 51 and the second hydraulic pressure regulating valve 52 such that the servo pressure and the master pressure can be maintained.

In the first brake control, when the target WC pressure is decreased, the brake control unit 25 controls the first hydraulic pressure regulating valve 51 and the second hydraulic pressure regulating valve 52 such that the master pressure decreases to the hydraulic pressure corresponding to the target WC pressure. Thus, the master piston 43 moves rearward, and the brake fluid flows from the wheel cylinders 11 for the front wheels FL and FR into the master chamber Rm via the first hydraulic circuit 611 of the brake actuator 23. As a result, the WC pressures of the front wheels FL and FR decrease to the target WC pressure. The brake control unit 25 controls the first hydraulic pressure regulating valve 51 such that the servo pressure decreases to the hydraulic pressure corresponding to the target WC pressure. Thus, the brake fluid flows from the wheel cylinders 11 for the rear wheels RL and RR into the fourth flow passage 56. As a result, the WC pressures of the rear wheels RL and RR decrease to the target WC pressure.

Next, the second brake control will be described.

The second brake control can be executed when brake forces of respective rear wheels RL and RR connected to the second hydraulic circuit 612 are to be individually regulated. For example, the second brake control may be executed when a traction control (hereinafter, also referred to as "TRC") or an electronic stability control (hereinafter, also referred to as "ESC") is executed. The TRC is a control for preventing acceleration slips of the wheels FL, FR, RL, and RR. The ESC is a control for preventing an excessive oversteer behavior and an excessive understeer behavior based on the target yaw rate and the actual yaw rate.

When the TRC is executed, the wheels FL, FR, RL, and RR to be subjected to the brake control and target WC pressures of the wheels FL, FR, RL, and RR are determined based on the slip amounts of the wheels FL, FR, RL, and RR. Thereafter, the WC pressures of the wheels FL, FR, RL, and RR to be subjected to the brake control are regulated to the target WC pressures. In this case, when at least one of the rear wheels RL and RR is subjected to the brake control, the second brake control is executed as the TRC.

When the ESC is executed, the wheels FL, FR, RL, and RR to be subjected to the brake control and the target WC pressures of the wheels FL, FR, RL, and RR are determined based on the target yaw rate and the actual yaw rate. Thereafter, the WC pressures of the wheels FL, FR, RL, and RR to be subjected to the brake control are regulated to the target WC pressures. In this case, when at least one of the rear wheels RL and RR is subjected to the brake control, the second brake control is executed as the ESC.

Hereinafter, as an example, a case where the brake control unit 25 regulates the WC pressure of the right rear wheel RR to the target WC pressure during execution of the second brake control will be described.

During the execution of the second brake control, since the brake operation member 21 is not operated, both the first hydraulic pressure regulating valve 51 and the second hydraulic pressure regulating valve 52 of a servo pressure generating device are opened. The holding valve 66 corresponding to the right rear wheel RR of the second hydraulic circuit 612 of the brake actuator 23 is opened, and the corresponding pressure reducing valve 67 is closed.

In the second brake control, when the target WC pressure of the right rear wheel RR is increased, the brake control unit 25 operates the second pressurizing unit 72 of the brake actuator 23. Thus, the pump 632 discharges the brake fluid taken in from the reservoir tank 24 to the intermediate fluid passage 712 via the fourth flow passage 56, the tank-side flow passage 702, the reservoir 682, and the suction flow passage 692. The brake control unit 25 reduces an opening degree of the second differential pressure regulating valve 622 such that a differential pressure corresponding to the target WC pressure is generated on both sides of the second differential pressure regulating valve 622. Thus, the differential pressure generated on both sides of the second differential pressure regulating valve 622 increases, and the WC pressure of the right rear wheel RR increases to the target WC pressure. At this time, when the WC pressure of the left rear wheel RL is not increased, the holding valve 66 corresponding to the left rear wheel RL is closed.

In the second brake control, when the WC pressure of the right rear wheel RR is maintained, the brake control unit 25 maintains the opening degree of the second differential pressure regulating valve 622 in a state where the pump 632 is operated. Thus, the differential pressure generated on both sides of the second differential pressure regulating valve 622 is maintained constant, and the WC pressure of the right rear wheel RR is maintained at the target WC pressure.

In the second brake control, when the target WC pressure of the right rear wheel RR is decreased, the brake control unit 25 increases, in a state where the pump 632 is operated, the opening degree of the second differential pressure regulating valve 622 such that the differential pressure corresponding to the target WC pressure is generated on both sides of the second differential pressure regulating valve 622. Thus, the differential pressure generated on both sides of the second differential pressure regulating valve 622 decreases, and the WC pressure of the right rear wheel RR decreases to the target WC pressure.

In the second brake control, modes are switched among a mode for increasing the WC pressures of the rear wheels RL and RR to be subjected to the brake control, a mode for maintaining the WC pressures of the rear wheels RL and RR to be subjected to the brake control, and a mode for decreasing the WC pressures of the rear wheels RL and RR to be subjected to the brake control according to changes in parameters which is used for the execution of the TRC and the ESC.

Not only the rear wheels RL and RR but also the front wheels FL and FR may be subjected to the brake controls in the TRC and the ESC. When the front wheels FL and FR are to be subjected to the brake controls in the TRC and the ESC, the brake control unit 25 controls, by operating the third pressurizing unit 73, the WC pressures of the front wheels FL and FR that are to be subjected to the brake controls.

As described above, the brake control unit 25 of the present embodiment operates the second pressurizing unit 72 when it is necessary to increase the WC pressures of the rear wheels RL and RR during the execution of the second brake control. However, in this case, there is a following concern about the point that the pump 632 of the second pressurizing unit 72 supplies the brake fluid taken in from the reservoir tank 24 into the wheel cylinders 11 for the rear wheels RL and RR via the fourth flow passage 56 in which the first hydraulic pressure regulating valve 51 and the second hydraulic pressure regulating valve 52 are provided. That is, there is a possibility that the brake control unit 25 cannot rapidly increase the WC pressures of the rear wheels RL and RR due to a pressure loss in the fourth flow passage 56 and pressure losses in the hydraulic pressure regulating valves 51 and 52. When the WC pressures of the front wheels FL and FR are increased by operating the third pressurizing unit 73, the increase in the WC pressures of the front wheels FL and FR is less likely to delay because the first flow passage 331 is not provided with a control valve.

Therefore, when it is necessary to increase the WC pressures during the execution of the second brake control, the brake control unit 25 of the present embodiment auxiliarily operates the first pressurizing unit 54 to rapidly increase the WC pressures of the rear wheels RL and RR. Specifically, when the WC pressures of the rear wheels RL and RR are increased by operating the second pressurizing unit 72 during the execution of the second brake control, the brake control unit 25 executes an auxiliary brake control in which the first pressurizing unit 54 is operated to assist the second pressurizing unit 72 to increase the WC pressures of the rear wheels RL and RR.

Here, when the pressure loss in the fourth flow passage and the pressure losses in the hydraulic pressure regulating valves 51 and 52 are large, in the fourth flow passage 56, the hydraulic pressure on a second pressurizing unit 72 side of the first hydraulic pressure regulating valve 51 and the second hydraulic pressure regulating valve 52 is lower than the hydraulic pressure on a reservoir tank 24 side of the first hydraulic pressure regulating valve 51 and the second hydraulic pressure regulating valve 52. Specifically, since the reservoir tank 24 communicates with the atmosphere, in the fourth flow passage 56, the hydraulic pressure on the second pressurizing unit 72 side of the first hydraulic pressure regulating valve 51 is a negative pressure less than an atmospheric pressure. Therefore, in a case where the WC pressures of the rear wheels RL and RR are increased by operating the second pressurizing unit 72 during the execution of the second brake control, the brake control unit 25 executes the auxiliary brake control when a hydraulic pressure difference $\Delta P$, which is a difference obtained by subtracting the servo pressure from the atmospheric pressure, is equal to or greater than a hydraulic pressure difference determination value $\Delta Pth$. The hydraulic pressure difference determination value $\Delta Pth$ is preferably set in advance based on magnitudes of the above-mentioned pressure losses or the like.

Viscosity of the brake fluid tends to be lower when a temperature of the brake fluid is low than when the temperature is high. If the viscosity of the brake fluid is low, when the WC pressures of the rear wheels RL and RR are increased by operating the second pressurizing unit 72 during the execution of the second brake control, the pressure loss in the fourth flow passage 56 and the pressure losses in the hydraulic pressure regulating valves 51 and 52 are likely to increase. Therefore, in a case where the WC pressures of the rear wheels RL and RR are increased by operating the second pressurizing unit 72 during the execution of the second brake control, the brake control unit 25 executes the auxiliary brake control when a temperature of an installation atmosphere (hereinafter, also referred to as an "atmosphere temperature Te") of the brake device 20 is equal to or lower than a temperature determination value Teth. The atmosphere temperature Te of the brake device 20 may be acquired based on, for example, a detection result of an outside air temperature sensor provided in the vehicle. On the other hand, the temperature determination value Teth is preferably set in advance in consideration of the above-mentioned pressure losses or in consideration of viscosity characteristics with respect to a temperature change in the brake fluid. When the brake device 20 includes a sensor that directly detects the temperature of the brake fluid, the brake control unit 25 may use the temperature of the brake fluid instead of the atmosphere temperature Te.

Next, execution end conditions of the auxiliary brake control will be described.

The brake control unit 25 ends, even during the execution of the second brake control, the auxiliary brake control on a condition that an execution time Tx of the auxiliary brake control is equal to or longer than an end determination time Txth. The end determination time Txth is preferably set in advance to a time required to increase the WC pressures of the rear wheels RL and RR. Therefore, the end determination time Txth may be set to be longer as the target WC pressures of the rear wheels RL and RR to be subjected to the second brake control are larger, or may be set to be longer in a case where both the right rear wheel RR and the left rear wheel RL are subjected to the second brake control than in a case where one of the right rear wheel RR and the left rear wheel RL is subjected to the second brake control.

The brake control unit 25 ends the auxiliary brake control on a condition that the increase in the WC pressures of the rear wheels RL and RR to be subjected to the second brake control is ended during the execution of the second brake control. The condition that the increase in the WC pressures of the rear wheels RL and RR to be subjected to the second brake control is ended includes that the mode is shifted from the mode for increasing the WC pressures to the mode for maintaining the WC pressures or the mode for decreasing the WC pressures.

When the first pressurizing unit 54 is operated, the brake fluid may be supplied to the servo chamber Rs via the fifth flow passage 57, the fourth flow passage 56, the seventh flow passage 59, and the sixth flow passage 58. Therefore, the brake control unit 25 ends the auxiliary brake control when it is determined that the simulator hydraulic pressure and the master pressure are increased due to the operation of the first pressurizing unit 54 during the execution of the second brake control. The reason is that, in this case, the operation of the first pressurizing unit 54 may affect the WC pressures of the front wheels FL and FR.

Further, the brake control unit 25 may end the auxiliary brake control on a condition that a residual fluid amount of the brake fluid in the reservoir tank 24 is equal to or less than a predetermined fluid amount determination value, or the brake control unit 25 may end the auxiliary brake control at an end timing of the second brake control, in other words, at the same time as an end timing of the operation of the second pressurizing unit 72.

Next, a flow of a process to be executed by the brake control unit 25 will be described with reference to a flowchart illustrated in FIG. 2. The present process is a process to be executed when the brake control unit 25 executes the second brake control on at least one of the right rear wheel RR and the left rear wheel RL. Therefore, the present process is executed in a situation where the first hydraulic pressure regulating valve 51 and the second hydraulic pressure regulating valve 52 are opened and the second pressurizing unit 72 is operated.

Figure 2:
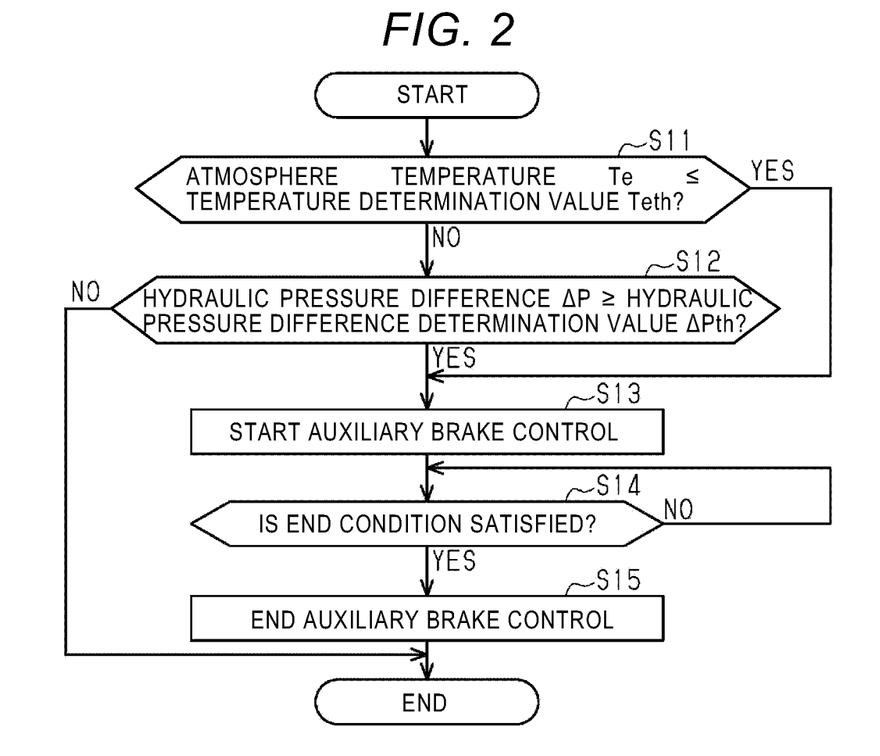
FIG. 2 is a flowchart illustrating a flow of a process to be executed by a brake control unit of the brake device.

As illustrated in FIG. 2, the brake control unit 25 determines whether the atmosphere temperature Te of the brake device 20 is equal to or lower than the temperature determination value Teth (S11). When the atmosphere temperature Te of the brake device 20 is equal to or lower than the temperature determination value Teth (YES in S11), that is, when the viscosity of the brake fluid is expected to be high, the brake control unit 25 shifts the process to step S13 to be described later. On the other hand, when the atmosphere temperature Te of the brake device 20 is higher than the temperature determination value Teth (NO in S11), that is, when the viscosity of the brake fluid is expected to be low, the brake control unit 25 determines whether the hydraulic pressure difference ΔP is equal to or greater than the hydraulic pressure difference determination value ΔPth (S12).

When the hydraulic pressure difference ΔP is less than the hydraulic pressure difference determination value ΔPth (NO in S12), that is, when a relatively large pressure loss does not occur in a supply path of the brake fluid from the reservoir tank 24 to the second hydraulic circuit 612, the brake control unit 25 ends the process. In this case, the auxiliary brake control is not executed.

On the other hand, when the hydraulic pressure difference ΔP is equal to or larger than the hydraulic pressure difference determination value ΔPth (YES in S12), that is, when a relatively large pressure loss occurs in the supply path of the brake fluid from the reservoir tank 24 to the second hydraulic circuit 612, the brake control unit 25 shifts the process to the next step S13.

In step S13, the brake control unit 25 starts the auxiliary brake control. That is, the brake control unit 25 causes the first pressurizing unit 54 to discharge the brake fluid toward the second hydraulic circuit 612. In step S13, the brake control unit 25 may operate the first pressurizing unit 54 at a minimum rotation speed at which a discharge flow rate of the first pressurizing unit 54 can be stabilized, or the brake control unit 25 may vary the discharge flow rate of the first pressurizing unit 54 according to a discharge flow rate of the second pressurizing unit 72.

Thereafter, the brake control unit 25 determines whether an end condition of the auxiliary brake control is satisfied (S14). When the end condition of the auxiliary brake control is not satisfied (NO in S14), the brake control unit 25 executes the process of step S14 again. That is, the brake control unit 25 continues the execution of the auxiliary brake control. On the other hand, when the end condition of the auxiliary brake control is satisfied (YES in S14), the brake control unit 25 ends the auxiliary brake control (S15), and ends the present process.

Next, with reference to a timing chart illustrated in FIG. 3, a temporal change in the WC pressure of the right rear wheel RR to be subjected to the second brake control when the second brake control is started at a first timing T11 will be described.

Figure 3:
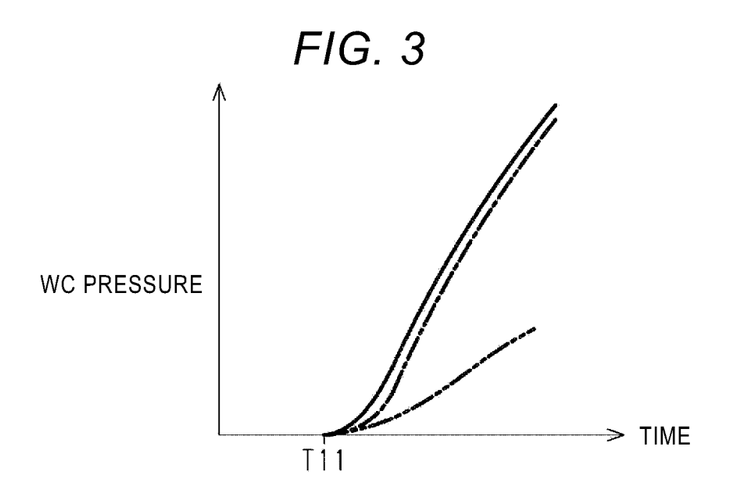
FIG. 3 is a timing chart illustrating a transition when a hydraulic pressure in a wheel cylinder is increased by operating a second pressurizing unit.

In FIG. 3, in the brake device 20 of the present embodiment, the temporal change in the WC pressure when the atmosphere temperature Te is not low is indicated by a solid line, and the temporal change in the WC pressure when the atmosphere temperature Te is low is indicated by a one-dot chain line. In FIG. 3, in a brake device of a comparative example, the temporal change in the WC pressure when the atmosphere temperature Te is low is indicated by a two-dot chain line. Unlike the case of the present embodiment, the brake control of the comparative example is performed by a device that does not perform the auxiliary brake control when the second brake control is executed.

As indicated by the solid line in FIG. 3, when the atmosphere temperature Te is not low, the WC pressure rapidly increases when the second pressurizing unit 72 is operated at the first timing T11. The reason is that, in this case, the viscosity of the brake fluid is small, and the pressure loss when the brake fluid flows from the reservoir tank 24 to the intermediate fluid passage 712 is small. Therefore, in this case, it is not necessary to operate the first pressurizing unit 54.

On the other hand, as indicated by the two-dot chain line in FIG. 3, when the atmosphere temperature Te is low, the WC pressure only gently increases even when the second pressurizing unit 72 is operated at the first timing T11. The reason is that, in this case, the viscosity of the brake fluid is high, and the pressure loss when the brake fluid flows from the reservoir tank 24 to the intermediate fluid passage 712 is large. Therefore, in the brake device of the comparative example, a differential pressure necessary for increasing the WC pressure cannot be generated on both sides of the second differential pressure regulating valve 622 in a short time.

Therefore, in the present embodiment, as indicated by the one-dot chain line in FIG. 3, when the atmosphere temperature Te is low, the first pressurizing unit 54 is auxiliarily operated together with the second pressurizing unit 72 at the first timing T11. Therefore, the differential pressure necessary for increasing the WC pressure is quickly generated on both sides of the second differential pressure regulating valve 622, and the WC pressure is quickly increased as in the case indicated by the solid line in FIG. 3. A start timing of the electric motor 542 in the first pressurizing unit 54 may be the same as a start timing of the electric motor 64 in the second pressurizing unit 72, and is preferably a timing before or after the start timing of the electric motor 64.

Actions and effects of the present embodiment will be described.

(1) In the second brake control, when the WC pressures of the rear wheels RL and RR are increased by operating the second pressurizing unit 72, the first pressurizing unit 54 is auxiliarily operated in addition to the second pressurizing unit 72. Therefore, in the second brake control, even when the WC pressures of the rear wheels RL and RR are increased by operating the second pressurizing unit 72, a delay when the WC pressures increase to the target WC pressures can be prevented. That is, controllability when the WC pressures in the wheel cylinders 11 are regulated by operating the second pressurizing unit 72 can be improved. Therefore, for example, when the rear wheels RL and RR are subjected to the brake control during the execution of the ESC and the TRC, a delay in the increase in the brake forces of the rear wheels RL and RR that are subjected to the brake control can be prevented.

(2) The fourth flow passage 56 is provided with the hydraulic pressure regulating valves 51 and 52 in which pressure losses are likely to occur. When the hydraulic pressure difference $\Delta P$ between the servo pressure and the atmospheric pressure is large, the delay in the increase in the WC pressures of the rear wheels RL and RR is likely to occur. The servo pressure is the hydraulic pressure on the second pressurizing unit 72 side of the hydraulic pressure regulating valves 51 and 52, and the atmospheric pressure is the hydraulic pressure on the reservoir tank 24 side of the hydraulic pressure regulating valves 51 and 52. In this regard, in the present embodiment, whether to execute the auxiliary brake control during the execution of the second brake control is determined based on the hydraulic pressure difference $\Delta P$. Therefore, the auxiliary brake control can be executed in the brake device 20 according to an occurrence situation of the pressure loss.

In the present embodiment, when the hydraulic pressure difference $\Delta P$ is less than the hydraulic pressure difference determination value $\Delta Pth$, it can be determined that no delay occurs in the increase in the WC pressures when the WC pressures of the rear wheels RL and RR are increased by the execution of the second brake control. Therefore, when the hydraulic pressure difference $\Delta P$ is less than the hydraulic pressure difference determination value $\Delta Pth$, an auxiliary brake control is not executed during the execution of the second brake control. That is, the first pressurizing unit 54 is not operated. Therefore, an increase in opportunities of operating the first pressurizing unit 54 can be prevented.

(3) The viscosity of the brake fluid can change according to the temperature of the brake fluid. Therefore, in the present embodiment, whether to execute the auxiliary brake control during the execution of the second brake control is determined based on the atmosphere temperature Te. Therefore, in a case where a relatively large pressure loss occurs, the auxiliary brake control can be executed in the brake device 20.

On the other hand, when the temperature of the brake fluid is not low and the viscosity of the brake fluid is not high, it can be determined that no delay occurs in the increase in the WC pressures when the WC pressures of the rear wheels RL and RR are increased by the execution of the second brake control. Therefore, when the atmosphere temperature Te is higher than the temperature determination value Teth, the auxiliary brake control is not executed during the execution of the second brake control. That is, the first pressurizing unit 54 is not operated. Therefore, the increase in opportunities of operating the first pressurizing unit 54 can be prevented.

(4) The auxiliary brake control is ended when the execution time Tx of the auxiliary brake control is equal to or longer than the end determination time Txth. Therefore, an excessive amount of brake fluid from the first pressurizing unit 54 can be prevented from being supplied to the second hydraulic circuit 612.

(5) The auxiliary brake control is ended when the increase in the WC pressures of the rear wheels RL and RR by the second pressurizing unit 72 is ended. Therefore, an excessive amount of brake fluid from the first pressurizing unit 54 can be prevented from being supplied to the second hydraulic circuit 612. An operation time of the first pressurizing unit 54 can be prevented from becoming too long.

(6) In a case where the auxiliary brake control is also executed when the WC pressures of the rear wheels RL and RR are increased by the execution of the second brake control, the start timing of the electric motor 542 of the first pressurizing unit 54 can be temporally shifted from the start timing of the electric motor 64 of the second pressurizing unit 72. That is, a generation timing of an inrush current in the electric motor 542 is temporally shifted from a generation timing of an inrush current in the electric motor 64. As a result, when the WC pressures of the rear wheels RL and RR are increased by the execution of the second brake control, an excessive load can be prevented from being applied to an in-vehicle battery.

(7) In the brake device 20, the second hydraulic pressure regulating valve 52 and the check valve 53 are provided in parallel. Therefore, when the WC pressures of the rear wheels RL and RR are increased by the execution of the second brake control, the brake fluid can bypass the second hydraulic pressure regulating valve 52 and flow in the sixth flow passage 58. Therefore, when the WC pressures of the rear wheels RL and RR are increased during the execution of the second brake control, a load of the second pressurizing unit 72 is reduced by an amount by which the pressure loss in the second hydraulic pressure regulating valve 52 is reduced.

The present embodiment can be implemented by modifications as follows. The present embodiment and the following modifications can be implemented in combination with each other within a technically consistent range.

The brake control unit 25 may determine, based on one of the hydraulic pressure difference $\Delta P$ and the atmosphere temperature Te, whether to execute the auxiliary brake control. That is, in the flowchart illustrated in FIG. 2, one of the process of step S11 and the process of step S12 may be omitted.

The brake control unit 25 may execute the auxiliary brake control when the atmosphere temperature Te is equal to or lower than the temperature determination value Teth and the hydraulic pressure difference ΔP is equal to or higher than the hydraulic pressure difference determination value ΔPth.

When the auxiliary brake control is executed during the execution of the second brake control, the brake control unit 25 may control the hydraulic pressure regulating valves 51 and 52 such that the brake fluid discharged by the first pressurizing unit 54 does not reach the servo chamber Rs of the master cylinder 31.

The brake control unit 25 may start the auxiliary brake control when a flag indicating that the TRC and the ESC are being executed is turned on, or may start the auxiliary brake control when a flag indicating that the electric motor 64 of the second pressurizing unit 72 is being driven is turned on.

The brake control unit 25 may start the auxiliary brake control in accordance with at least one start condition among a plurality of auxiliary brake control start conditions described above.

The brake control unit 25 may end the auxiliary brake control in accordance with at least one end condition among a plurality of auxiliary brake control end conditions described above.

The auxiliary brake control can be applied not only to the ESC and the TRC but also to a brake control that can increase the WC pressures of the rear wheels RL and RR by operating the second pressurizing unit 72.

The configuration of the first pressurizing unit 54 can be changed as appropriate. As long as the first pressurizing unit 54 can supply the brake fluid toward the second pressurizing unit 72, the first pressurizing unit 54 may include an accumulator that supplies a high-pressure brake fluid, or may include an electric cylinder that supplies the brake fluid by a piston that moves forward and backward when being energized.

When the simulator hydraulic pressure or the master hydraulic pressure increases during the execution of the second brake control, the brake control unit 25 may end the second brake control and start the first brake control on the assumption that the start condition of the first brake control is satisfied. However, the brake control unit 25 may continue the execution of the second brake control when it can be determined during the execution of the auxiliary brake control that the increase in the simulator hydraulic pressure or the increase in the master hydraulic pressure is caused by the operation of the first pressurizing unit 54.

The brake actuator 23 is preferably disposed vertically below the reservoir tank 24 in a situation where the brake device 20 is mounted on the vehicle. Accordingly, the load of the second pressurizing unit 72 when the WC pressures are increased during the execution of the second brake control can be reduced by a water head.

The brake device 20 may not include the hydraulic pressure regulating valves 51 and 52 in the fourth flow passage 56. In this case, an action and effect the same as the above-mentioned action and effect (1) can also be expected for that a flow passage resistance can be generated in the fourth flow passage 56.

In the above-mentioned embodiment, the brake actuator 23 capable of controlling the WC pressures of the rear wheels RL and RR by operating the second pressurizing unit 72 is exemplified. However, the brake actuator 23 may be embodied to be able to control the WC pressures of the front wheels FL and FR by operating the second pressurizing unit 72. Further, the brake actuator 23 may be embodied to be able to control the WC pressure of one of the front wheels FL and FR and the WC pressure of one of the rear wheels RL and RR by operating the second pressurizing unit 72.

The vehicle may be a vehicle that uses an internal combustion engine as a drive source, a vehicle that uses a motor as a drive source, or a vehicle that uses an internal combustion engine and a motor as drive sources.

The vehicle may include a generator for regeneration. In this case, it is preferable that the brake control unit 25 applies the brake forces to the wheels FL, FR, RL, and RR by causing the brake device 20 and the generator to cooperate with each other.

The brake control unit 25 may be configured as a circuit including: one or more processors that operate in accordance with a computer program (software), one or more dedicated hardware circuits such as dedicated hardware (application specific integrated circuit: ASIC) that executes at least a part of various processes, or a combination of the one or more processors and the one or more dedicated hardware circuits. The processor includes a CPU and a memory such as an RAM and an ROM, and the memory stores program codes or commands configured to cause the CPU to execute a process. The memory, that is, a storage medium, includes any available medium that can be accessed by a general-purpose computer or a dedicated computer.

The invention claimed is:

1. A brake device for a vehicle, comprising:
a first pressurizing unit configured to increase, by supplying brake fluid into a wheel cylinder provided in a wheel of a vehicle, a hydraulic pressure in the wheel cylinder;
a second pressurizing unit connected to a reservoir tank via a communication passage and configured to increase, by supplying the brake fluid taken in from the reservoir tank into the wheel cylinder, the hydraulic pressure in the wheel cylinder; and
a brake control unit configured to control at least one of the first pressurizing unit and the second pressurizing unit based on a target value of the hydraulic pressure in the wheel cylinder, wherein
the brake control unit is configured to, when the hydraulic pressure in the wheel cylinder is to be increased by operating the second pressurizing unit, execute an auxiliary brake control in which the first pressurizing unit is operated to assist the second pressurizing unit to increase the hydraulic pressure in the wheel cylinder,
the communication passage is provided with an electronically controlled regulating valve,
the brake control unit is configured to execute the auxiliary brake control when a hydraulic pressure difference, which is a difference obtained by subtracting a hydraulic pressure on a second pressurizing unit side of the regulating valve from a hydraulic pressure on a reservoir tank side of the regulating valve, is equal to or greater than a hydraulic pressure difference determination value in the communication passage, and
the brake control unit is configured to execute the auxiliary brake control when a temperature of an installation atmosphere of the brake device is equal to or lower than a temperature determination value.

2. The brake device for a vehicle according to claim 1, wherein
the brake control unit is configured to end the auxiliary brake control on a condition that a residual fluid amount of the brake fluid in the reservoir tank is equal to or less than a fluid amount determination value during the execution of the auxiliary brake control.

3. A brake device for a vehicle, comprising:
a first pressurizing unit configured to increase, by supplying brake fluid into a wheel cylinder provided in a wheel of a vehicle, a hydraulic pressure in the wheel cylinder;
a second pressurizing unit connected to a reservoir tank via a communication passage and configured to increase, by supplying the brake fluid taken in from the reservoir tank into the wheel cylinder, the hydraulic pressure in the wheel cylinder; and
a brake control unit configured to control at least one of the first pressurizing unit and the second pressurizing unit based on a target value of the hydraulic pressure in the wheel cylinder, wherein
the brake control unit is configured to, when the hydraulic pressure in the wheel cylinder is to be increased by operating the second pressurizing unit, execute an auxiliary brake control in which the first pressurizing unit is operated to assist the second pressurizing unit to increase the hydraulic pressure in the wheel cylinder,
the brake control unit is configured to execute the auxiliary brake control when a temperature of an installation atmosphere of the brake device is equal to or lower than a temperature determination value, and
the brake control unit is configured to end the auxiliary brake control on a condition that a residual fluid amount of the brake fluid in the reservoir tank is equal to or less than a fluid amount determination value during the execution of the auxiliary brake control.

4. A brake device for a vehicle, comprising:
a first pressurizing unit configured to increase, by supplying brake fluid into a wheel cylinder provided in a wheel of a vehicle, a hydraulic pressure in the wheel cylinder;
a second pressurizing unit connected to a reservoir tank via a communication passage and configured to increase, by supplying the brake fluid taken in from the reservoir tank into the wheel cylinder, the hydraulic pressure in the wheel cylinder; and
a brake control unit configured to control at least one of the first pressurizing unit and the second pressurizing unit based on a target value of the hydraulic pressure in the wheel cylinder, wherein
the brake control unit is configured to, when the hydraulic pressure in the wheel cylinder is to be increased by operating the second pressurizing unit, execute an auxiliary brake control in which the first pressurizing unit is operated to assist the second pressurizing unit to increase the hydraulic pressure in the wheel cylinder, and
the brake control unit is configured to end the auxiliary brake control on a condition that a residual fluid amount of the brake fluid in the reservoir tank is equal to or less than a fluid amount determination value during the execution of the auxiliary brake control.

* * * * *